(12) United States Patent
Park et al.

(10) Patent No.: US 12,182,689 B2
(45) Date of Patent: Dec. 31, 2024

(54) DEEP NEURAL NETWORK ACCELERATOR USING HETEROGENEOUS MULTIPLY-ACCUMULATE UNIT

(71) Applicant: Korea University Research and Business Foundation, Seoul (KR)

(72) Inventors: Jongsun Park, Seoul (KR); Dongyeob Shin, Seoul (KR); Wonseok Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 674 days.

(21) Appl. No.: 16/985,415

(22) Filed: Aug. 5, 2020

(65) Prior Publication Data

US 2021/0158133 A1 May 27, 2021

(30) Foreign Application Priority Data

Nov. 27, 2019 (KR) .................. 10-2019-0154605

(51) Int. Cl.
*G06N 3/063* (2023.01)
*G06N 3/04* (2023.01)

(52) U.S. Cl.
CPC .............. *G06N 3/063* (2013.01); *G06N 3/04* (2013.01)

(58) Field of Classification Search
CPC ......... G06N 3/063; G06N 3/04; G06F 7/5443
See application file for complete search history.

(56) References Cited

U.S. PATENT DOCUMENTS

| | | | |
|---|---|---|---|
| 10,969,431 B1* | 4/2021 | Dorrance | G06F 11/0706 |
| 2018/0046900 A1* | 2/2018 | Dally | G06N 3/045 |
| 2018/0060039 A1* | 3/2018 | Liu | G06F 7/535 |
| 2018/0246855 A1* | 8/2018 | Redfern | G06F 3/0683 |
| 2020/0117982 A1* | 4/2020 | Chiu | G06N 3/045 |
| 2020/0201603 A1* | 6/2020 | Kozuma | G06F 7/5443 |
| 2020/0310758 A1* | 10/2020 | Desoli | G06N 3/045 |
| 2021/0089889 A1* | 3/2021 | Gope | G06N 3/04 |
| 2021/0124560 A1* | 4/2021 | Liu | G06F 7/5277 |

FOREIGN PATENT DOCUMENTS

| | | |
|---|---|---|
| KR | 10-2018-0075913 A | 7/2018 |
| KR | 10-2018-0123846 A | 11/2018 |
| KR | 10-2019-0052893 A | 5/2019 |

OTHER PUBLICATIONS

Kim D. Neurocube: Energy-Efficient Programmable Digital Deep Learning Accelerator based on Processor in Memory Platform ( Doctoral dissertation, Georgia Institute of Technology, Atlanta, GA, USA). (Year: 2017).*

* cited by examiner

*Primary Examiner* — Vincent Gonzales
*Assistant Examiner* — Sidney Vincent Bostw
(74) *Attorney, Agent, or Firm* — NSIP Law

(57) ABSTRACT

A deep neural network accelerator includes a unit array including a first sub-array including a first operational unit and a second sub-array including a second operational unit. The first and second operational units have different sizes from each other, the sizes of the first and second operational units are in proportion to each cumulative importance value accumulated in each operational unit of the unit array while performing a deep neural network operation, and the each cumulative importance value is obtained by accumulating an importance for each weight mapped to the each operational unit of the unit array.

19 Claims, 11 Drawing Sheets

DEEP NEURAL NETWORK ACCELERATOR USING HETEROGENEOUS MULTIPLY-ACCUMULATE UNIT

CROSS-REFERENCE TO RELATED APPLICATION

This U.S. non-provisional patent application claims priority under 35 U.S.C. § 119 of Korean Patent Application No. 10-2019-0154605, filed on Nov. 27, 2019, the contents of which are hereby incorporated by reference in its entirety.

BACKGROUND

1. Field of Disclosure

Embodiments of the present disclosure relate to a deep neural network accelerator using a heterogeneous multiply-accumulate unit.

2. Description of the Related Art

A deep neural network (DNN) gives state-of-the-art performance in many fields, such as an image recognition/classification, an object detection, or the like, based on many parameters and computational quantities.

Since the DNN computation requires a large amount of computation, a dedicated DNN accelerator that includes a large number of multiply-accumulate units is widely used in addition to general-purpose processors, such as CPU, GPU, or the like.

In detail, supply voltage scaling is the most effective method for the low-power implementation of the DNN accelerator, and the power consumption is reduced as the accelerator operates at a lower supply voltage due to the supply voltage scaling.

In this case, the DNN computation performance decreases due to a timing error of the multiply-accumulate unit caused by the low supply voltage, and thus, the supply voltage scaling is limited.

In particular, a probability of occurrence of the timing error varies depending on a hardware size of the multiply-accumulate unit. Even though the same multiply-accumulate operation is performed, the probability of occurrence of the timing error decreases as the hardware size increases since a critical path delay becomes shorter.

However, since a conventional DNN accelerator is designed as a single-sized multiply-accumulate unit, only the limited supply voltage scaling is possible due to the timing error during the low voltage operation.

SUMMARY

The present disclosure provides a deep neural network accelerator capable of reducing a limitation of supply voltage scaling without decreasing a DNN accuracy.

Embodiments of the inventive concept provide a deep neural network accelerator including a unit array including a first sub-array including a first operational unit and a second sub-array including a second operational unit. The first and second operational units have different sizes from each other, the sizes of the first and second operational units are in proportion to each cumulative importance value accumulated in each operational unit of the unit array while performing a deep neural network operation, and each cumulative importance value is obtained by accumulating an importance for each weight mapped to the each operational unit.

The deep neural network accelerator further includes an activator sequentially providing activations of an input feature map, which is previously stored, to the unit array, a weighting unit mapping a plurality of weight patterns vectorized in one dimension by each three-dimensional filter, which is previously set, to the unit array and providing different weights from each other to the each operational unit, and an accumulator accumulating a partial sum corresponding to a value obtained by multiplying each activation provided to the each operational unit by each weight in a column direction.

Each of the first and second operational units includes a multiplier including at least one transistors, a first multiplier flip-flop connecting the multiplier to the activator, a second multiplier flip-flop connecting the multiplier to the weighting unit, an accumulator accumulating a first partial sum output through the multiplier and a second partial sum output along a partial sum accumulation path, and a first accumulator flip-flop delaying the accumulated value of the first and second partial sums.

Each of the weight patterns includes a plurality of weights, and a number of the weight patterns corresponds to a number of at least one sub-array.

The weights are mapped to a plurality of an operational units of one sub-array of the at least one sub-array in a one-to-one correspondence.

The unit array includes a plurality of operational units including the first and second operational units and arranged in a column direction and a row direction.

The operational units have different sizes from each other for each sub-array.

The operational units adjacent to each other in the column direction and included in a pair of operational units among the operational units have different sizes from each other.

The operational units included in an operational unit block among the operational units have different sizes from each other, and the operational unit block comprises at least four operational units adjacent to each other in the column direction.

The unit array performs the deep neural network operation along a plurality of activation propagation paths corresponding to the row direction and a plurality of partial sum accumulation paths corresponding to the column direction.

Embodiments of the inventive concept provide a deep neural network accelerator including a unit array including first and second operational units adjacent to each other in a column direction and having different sizes from each other and third and fourth operational units adjacent to each other in the column direction, having different sizes from each other, and adjacent to the first and second operational units in a row direction, a first multiplexer determining a path between the first operational unit and one operational unit of the third and fourth operational units as a first activation propagation path, a second multiplexer determining a path between the second operational unit and the other operational unit of the third and fourth operational units as a second activation propagation path, and an activation propagation delay flip-flop delaying the first activation propagation path when the one operational unit is the third operational unit.

The first operational unit has a size greater than a size of the second operational unit when an importance of a weight mapped to the first operational unit is greater than an importance of a weight mapped to the second operational unit.

When an importance of a weight mapped to the fourth operational unit is greater than an importance of a third weight mapped to the third operational unit, the first multiplexer determines a path between the first and fourth operational units as the first activation propagation path, and the second multiplexer determines a path between the second and third operational units as the second activation propagation path.

When an importance of a weight mapped to the fourth operational unit is smaller than an importance of a weight mapped to the third operational unit, the first multiplexer determines a path between the first and fourth operational units as the first activation propagation path, and the second multiplexer determines a path between the second and third operational units as the second activation propagation path.

Each of the first and second multiplexers is a two-to-one multiplexer.

Embodiments of the inventive concept provide a deep neural network accelerator including a unit array comprising a plurality of operational units, an activator providing activations to the unit array, a plurality of activation delay flip-flops receiving the activations from the activator and delaying the activations and an activation propagation switching unit determining activation propagation paths for the operational units in the unit of four operational units based on the activations delayed by the activation delay flip-flops.

The number of the activation delay flip-flops corresponds to the number of the operational units.

The unit array includes a first sub-array comprising first, second, third, and fourth operational units having different sizes from each other among the operational units and a second sub-array disposed adjacent to the first sub-array in a row line direction and including fifth, sixth, seventh, and eighth operational units having different sizes from each other, and a size of the first to fourth operational units decreases in the order of the first, second, third, and fourth operational units.

The propagation path determiner includes a fifth multiplexer selecting one activation propagation path among first, second, third, and fourth activation propagation paths with respect to the fifth operational unit using first diagonal-line activation delay flip-flops corresponding to the fifth operational unit, a sixth multiplexer selecting another activation propagation path among the first, second, third, and fourth activation propagation paths with respect to the sixth operational unit using second diagonal-line activation delay flip-flops corresponding to the sixth operational unit, a seventh multiplexer selecting another activation propagation path among the first, second, third, and fourth activation propagation paths with respect to the seventh operational unit using third diagonal-line activation delay flip-flops corresponding to the seventh operational unit, and an eighth multiplexer selecting the other activation propagation path among the first, second, third, and fourth activation propagation paths with respect to the eighth operational unit using fourth diagonal-line activation delay flip-flops corresponding to the eighth operational unit.

Each of the fifth, sixth, seventh, and eighth multiplexers is a four-to-one multiplexer.

According to the above, the deep neural network accelerator may reduce a limitation of the supply voltage scaling without decreasing the DNN accuracy.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
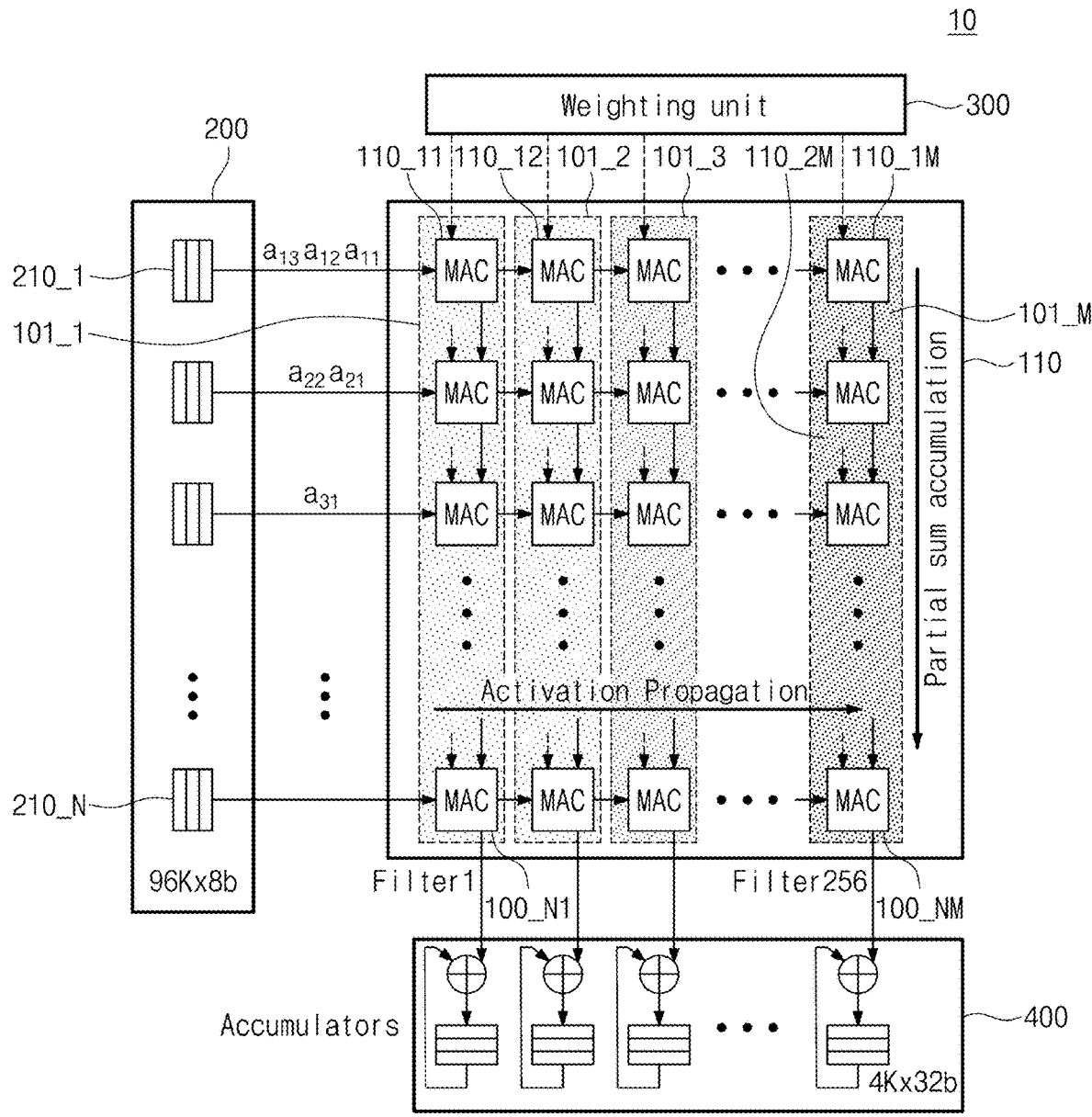
FIG. 1 is a block diagram showing a deep neural network accelerator according to an exemplary embodiment of the present disclosure.

As specific structural or functional descriptions for the embodiments according to the concept of the invention disclosed herein are merely exemplified for purposes of describing the embodiments according to the concept of the invention, the embodiments according to the concept of the invention may be embodied in various forms but are not limited to the embodiments described herein.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
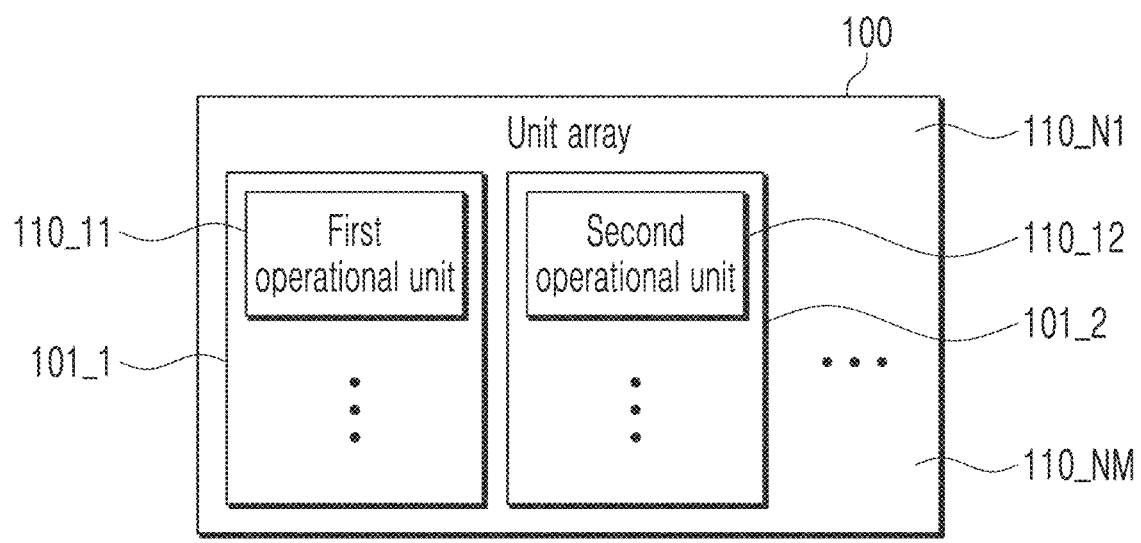
FIG. 2 is a block diagram showing one operational unit of FIG. 1.
Figure 3:
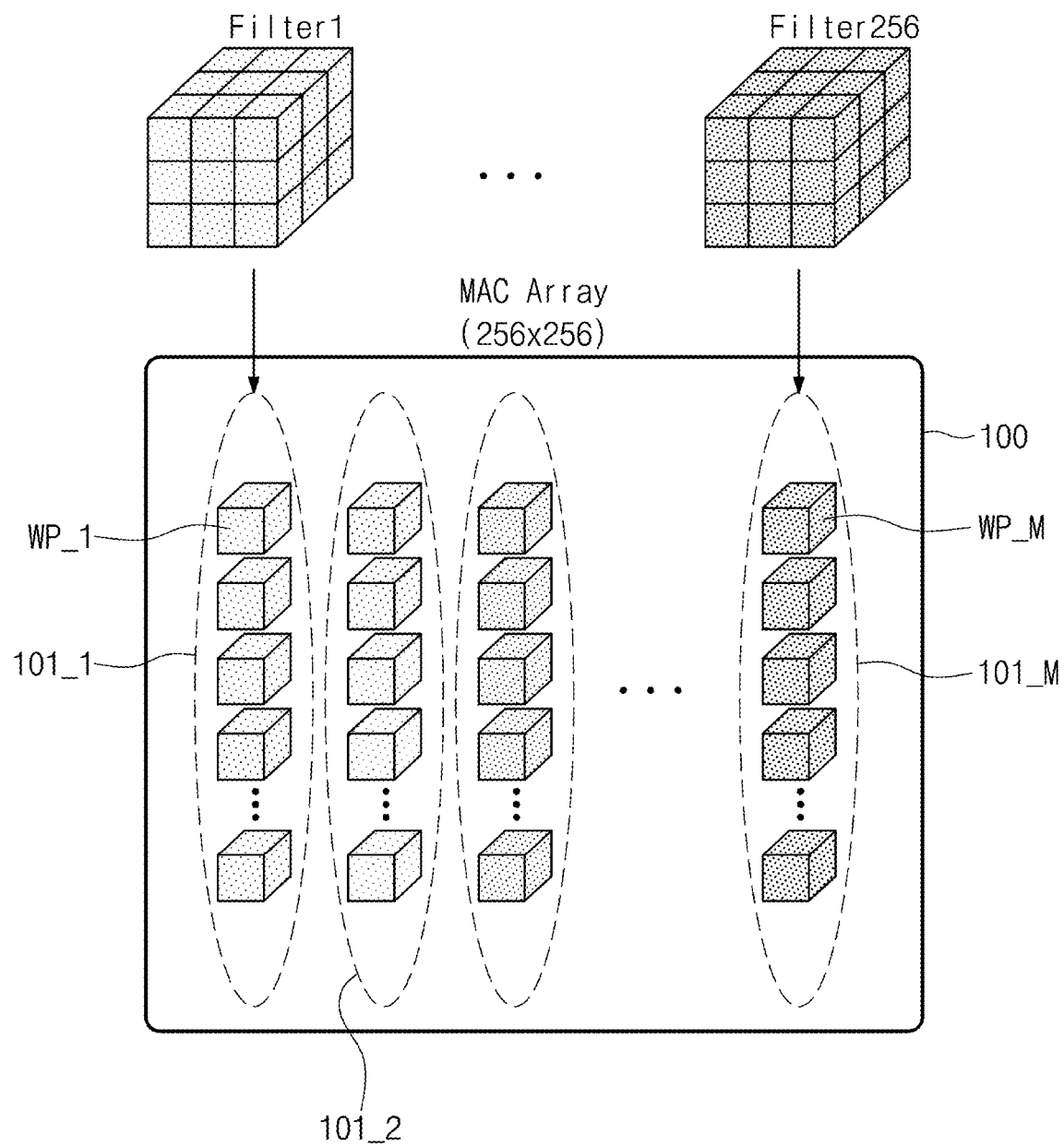
FIG. 3 is a view showing an example of a plurality of time-series weight patterns of FIG. 1.

FIG. 1 is a block diagram showing a deep neural network accelerator to according to an exemplary embodiment of the present disclosure, FIG. 2 is a block diagram showing a unit array 100 of FIG. 1, and FIG. 3 is a view showing a plurality of weight patterns mapped to the unit array 100 of FIG. 2.

Referring to FIGS. 1 and 2, the deep neural network accelerator 10 may include a unit array 100, an activator 200, a weighting unit 300, and an accumulator 400.

The unit array 100 may include a plurality of operational units 111_11 to 110_NM arranged in a column direction and a row direction. Each of the operational units 110_11 to 110_NM may be a multiply-accumulate unit that is capable of performing multiplication and accumulation operations.

For example, the operational units 110_11 to 110_NM may be arranged in the unit array 100 along a plurality of column lines and a plurality of row lines. In this case, the column lines and the row lines may be imaginary lines for specifying positions of the operational units 110_11 to 110_NM.

In addition, the unit array 100 may perform a deep neural network operation (hereinafter, referred to as 'DNN operation') along a plurality of activation propagation paths corresponding to the row direction and a plurality of partial sum accumulation paths corresponding to the column direction.

Further, the unit array 100 may be classified into at least one sub-array 101_1 to 101_M arranged in the row direction. In this case, the at least one sub-array 101_1 to 101_M may include first to N-th row operational units 110_11 to 110_N1 arranged in the column direction. A plurality of first to NM-th row operational units 110_11 to 110_N1, 110_12 to 110_N2, . . . may be the operational units 110_11 to 110_NM.

The unit array 100 according to the exemplary embodiment may include a first sub-array 101_1 including a first operational unit 110_11 and a second sub-array 101_2 including a second operational unit 101_12. The first and second operational units 110_11 and 110_12 may have different sizes from each other.

The size of the first and second operational units 110_11 and 110_12 may be in proportion to each cumulative importance value accumulated in each operational unit as the DNN operation is performed. In this case, each cumulative importance value may be a value obtained by accumulating importance for each weight mapped to each operational unit as the DNN operation is performed.

In detail, the size of the first operational unit 110_11 may be in proportion to the cumulative importance value accumulated in the first operational unit 110_11 as the DNN operation is performed, and the size of the second operational unit 110_12 may be in proportion to the cumulative importance value accumulated in the second operational unit 110_12 as the DNN operation is performed.

When the size of the first operational unit 110_11 is greater than the size of the second operational unit 110_12, the cumulative importance value accumulated in the first operational unit 110_11 may be greater than the cumulative importance value accumulated in the second operational unit 110_12.

Then, the activator 200 may include a plurality of buffers 210_1 to 210_N. In detail, the buffers 210_1 to 210N may individually store activations a11 to a31 of an input feature map Ifmap in advance. In addition, the buffers 210_1 to 210_N may sequentially and individually provide the activations a11 to a31 of the input feature map Ifmap to the unit array 100 along the row direction.

The weighting unit 300 may provide a plurality of weight patterns to the unit array 100 for each sub-array. In this case, the weight patterns WP_1 to WP_M may be a plurality of weights vectorized in one dimension by each three-dimensional (3D) filter that is previously set. The weights may be data for calculating a partial sum.

In detail, the weighting unit 300 may map the weight patterns WP_1 to WP_M for each sub-array in the unit array 100 and may provide different weights from each other to each operational unit. For example, as shown in FIG. 3, the number of the weight patterns WP_1 to WP_M may correspond to the number of the at least one sub-array 101_1 to 101_M. In this case, one weight pattern e.g., WP_1, may be mapped to one sub-array, e.g., 101_1, among the at least one sub-array 101_1 to 101_M in a one-to-one correspondence.

Then, the accumulator 400 may include a plurality of accumulators 410_1 to 410_M to accumulate the partial sum accumulated in the column direction for each sub-array. In detail, the accumulators 410_1 to 410_M may accumulate a partial sum, which corresponds to a value obtained by multiplying each activation provided to each operational unit through the activator 200 by each weight provided through the weighting unit 300, in the column direction.

For example, a first accumulator 410_1 among the accumulators 410_1 to 410_M may accumulate a first partial sum accumulation value output through the first sub-array 101_1, and a second accumulator 410_2 among the accumulators 410_1 to 410_M may accumulate a second partial sum accumulation value output through the second sub-array 101_2. In this case, the first sub-array 101_1 may output the first partial sum accumulation value by performing the DNN operation. In addition, the second sub-array 101_2 may output the second partial sum accumulation value by performing the DNN operation.

The deep neural network accelerator 10 according to the exemplary embodiment of the present disclosure may perform the DNN operation using the unit array 100, which includes the first and second operational units 110_11 and 110_12 having the size in proportion to each cumulative importance value and having different sizes from each other, the activator 200, the weighting unit 300, and the accumulator 400. Accordingly, the deep neural network accelerator 10 may reduce a limitation of the supply voltage scaling without decreasing a DNN accuracy.

Figure 4:
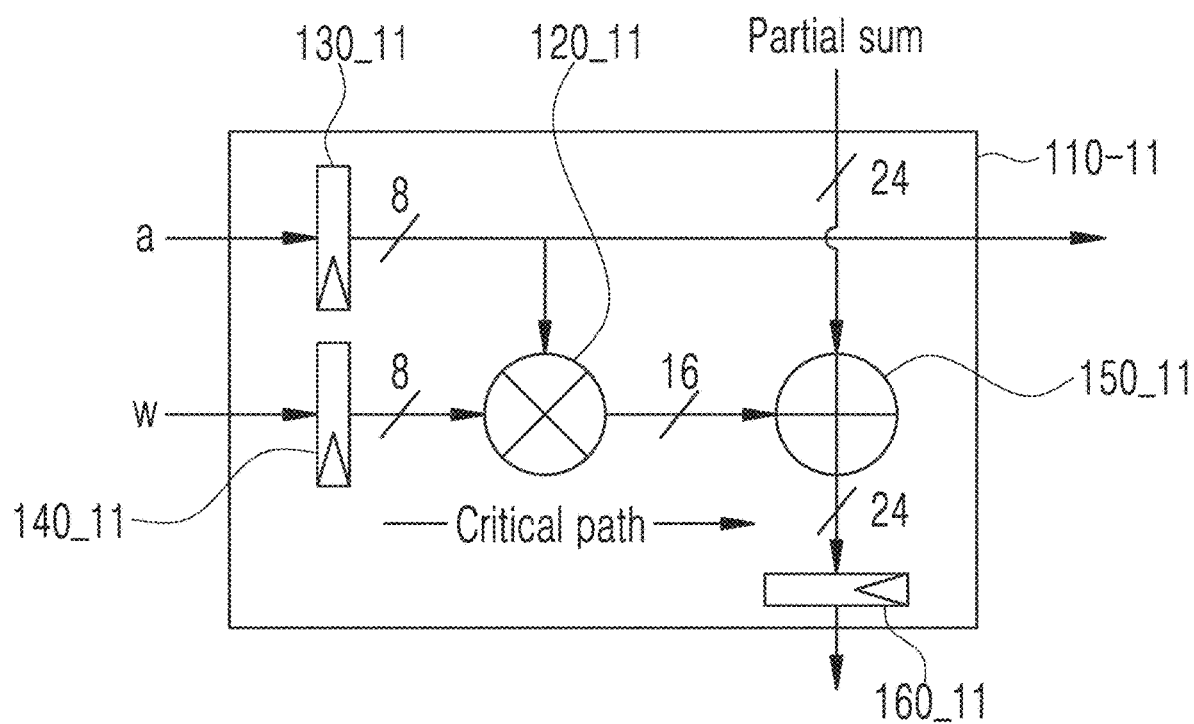
FIG. 4 is a block diagram showing one operational unit 110_11 of FIG. 1.

FIG. 4 is a block diagram showing one operational unit 110_11 of FIG. 1.

Referring to FIGS. 1 to 4, each of the operational units may include a multiplier 120_11, a first multiplier flip-flop 130_11, a second multiplier flip-flop 140_11, an accumulator 150_11, and a first accumulator flip-flop 160_11.

In detail, the multiplier 120_11 may include at least one transistors, and the first multiplier flip-flop 130_11 may be disposed between the multiplier 120_11 and the activator 200.

The second multiplier flip-flop 140_11 may be disposed between the multiplier 120_11 and the activator 200.

The accumulator 150_11 may add and accumulate a first partial sum output through the multiplier 120_11 and a second partial sum output through the partial sum accumulation paths. In this case, the partial sum accumulation paths may be paths that connect the operational units adjacent to each other in a column line direction. For example, the partial sum accumulation paths may correspond to the column lines of the unit array 100.

The first accumulator flip-flop 160_11 may delay the accumulation value of the first and second partial sums, which is output through the accumulator 150_11, and may output the accumulation value to the operational unit 110_21 adjacent thereto in the column line direction thereunder through the partial sum accumulation paths.

Each of the operational units 110_11 to 110_NM according to the exemplary embodiment may include a critical path defined at both sides of the multiplier 111_N1. In the critical path, a size of at least one or more transistors included in the multiplier 111_N1 may decrease the delay.

For example, when the size of at least one or more transistors included in the multiplier 111_N1 is small, the delay may increase in the critical path. When the size of at least one or more transistors included in the multiplier 111_N1 is large, the delay may decrease in the critical path. That is, the critical path delay may be inversely proportional to the size of each of the operational units 110_11 to 110_NM.

Figure 5A:
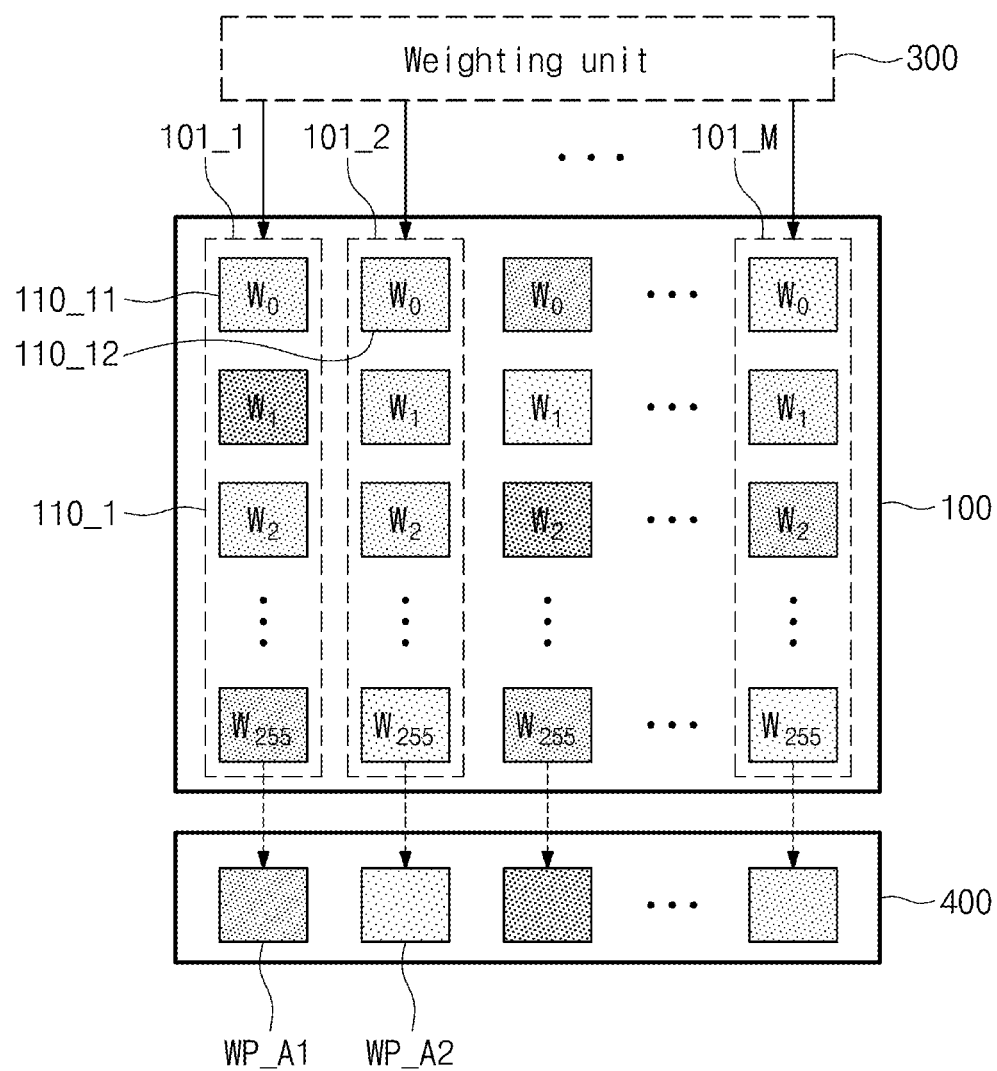
FIG. 5A is a view showing first and second weight patterns mapped to first and second sub-arrays of FIG. 1.
Figure 5B:
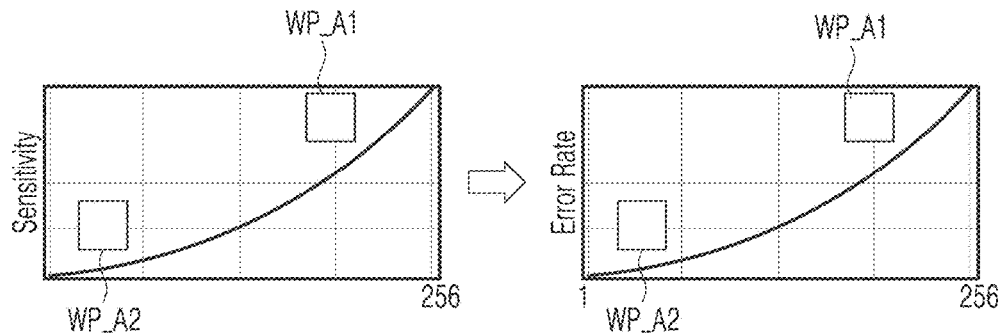
FIG. 5B is a view showing a relationship between the first and second weight patterns of FIG. 5A and an error rate.

FIG. 5A is a view showing first and second weight patterns mapped to first and second sub-arrays 101_1 and 101_2 of FIG. 1, and FIG. 5B is a view showing a relationship between the first and second weight patterns of FIG. 5A and an error rate.

Referring to FIGS. 1 to 5A, the accumulator 400 may compare an average WP_A1 of the first cumulative importance value output through the first sub-array 101_1 with an average WP_A2 of the second cumulative importance value output through the second sub-array 101_2. In this case, the first weight pattern WP_1 may be mapped to the first sub-array 101_1 through the weighting unit 300, and a second weight pattern WP_2 may be mapped to the second sub-array 101_2 through the weighting unit 300.

In detail, the accumulator 400 may accumulate the first cumulative importance value output through the first sub-array 101_1 to which the first weight pattern WP_1 is mapped and may accumulate the second cumulative importance value output through the second sub-array 101_2. In this case, the accumulator 400 may calculate the average WP_A1 of the first cumulative importance value and may calculate the average WP_A2 of the second cumulative importance value. Then, the accumulator 400 may compare the average WP_A1 of the first cumulative importance value corresponding to the first sub-array 101_1 with the average WP_A2 of the second cumulative importance value corresponding to the second sub-array 101_2.

The first and second sub-arrays 101_1 and 101_2 according to the exemplary embodiment may have the size proportional to the averages WP_A1 and WP_A2 of the first and second cumulative importance values calculated by the accumulator 400. For example, when the averages WP_A1 and WP_A2 of the first and second cumulative importance values are different from each other, the size of each of the operational units 110_11 to 110_N1 of the first sub-array 101_1 may be different from the size of each of the operational units 110_12 to 110_N2 of the second sub-array 101_2.

As shown in FIG. 5B, the average of the cumulative importance value calculated by the accumulator 400 may be in proportion to a timing error rate. That is, the size of each of the operational units 110_11 to 110_NM may be in proportion to the average of the cumulative importance value calculated by the accumulator 400 and may be in proportion to the timing error rate.

According to an embodiment, the operational units 110_11 to 110_NM may have substantially the same size for each sub-array. For example, the first sub-array 101_1 may include the first operational unit 110_11 and first other operational units 110_21 to 110_N1 arranged in the same column line direction as the first operational unit 110_11. The first operational unit 110_11 and first other operational units 110_11 to 110_N1 may have the same size as each other. In this case, the first operational unit 110_11 and first other operational units 110_21 to 110_N1 may have the size different from the size of the second operational unit, e.g., 110_32, and second other operational units 110_12, 110_22, 110_42 to 110_N2 of the second sub-array 101_2.

According to another exemplary embodiment, the operational units adjacent to each other in the column direction and included in a pair of operational units among the operational units 110_11 to 110_NM may have different sizes from each other. For example, the first and third operational units 110_11 and 110_21 may be adjacent to each other in the column direction and may have different sizes from each other. Fourth and fifth operational units 110_12 and 110_22 may be adjacent to each other in the column direction and may have different sizes from each other. In this case, the first and third operational units 110_11 and 110_21 and the fourth and fifth operational units 110_12 and 110_22 may be arranged to be adjacent to each other in the row direction.

Each of the first and third operational units 110_11 and 110_21 may have the size corresponding to an average between the cumulative importance value mapped to the first operational unit 110_11 and the cumulative importance value mapped to the third operational unit 110_11 and 110_21. In addition, each of the fourth and fifth operational units 110_12 and 110_22 may have the size corresponding to an average between the cumulative importance value mapped to the fourth operational unit 110_22 and the cumulative importance value mapped to the fifth operational unit 110_22.

For example, when the average of the cumulative importance value of the first and third operational units 110_11 and 110_21 is greater than the average of the cumulative importance value of the fourth and fifth operational units 110_12 and 110_22, the size of the first and third operational units 110_11 and 110_21 may be greater than the size of the fourth and fifth operational units 110_12 and 110_22. In this case, the first and third operational units 110_11 and 110_21 and the fourth and fifth operational units 110_12 and 110_22 may have different sizes from each other.

According to another exemplary embodiment, the operational units included in an operational unit block among the operational units 110_11 to 110_NM may have different sizes from each other. In this case, the operational unit block may include at least four operational units 110_11, 110_21, 110_31, and 110_41 adjacent to each other in the column direction.

Figure 6:
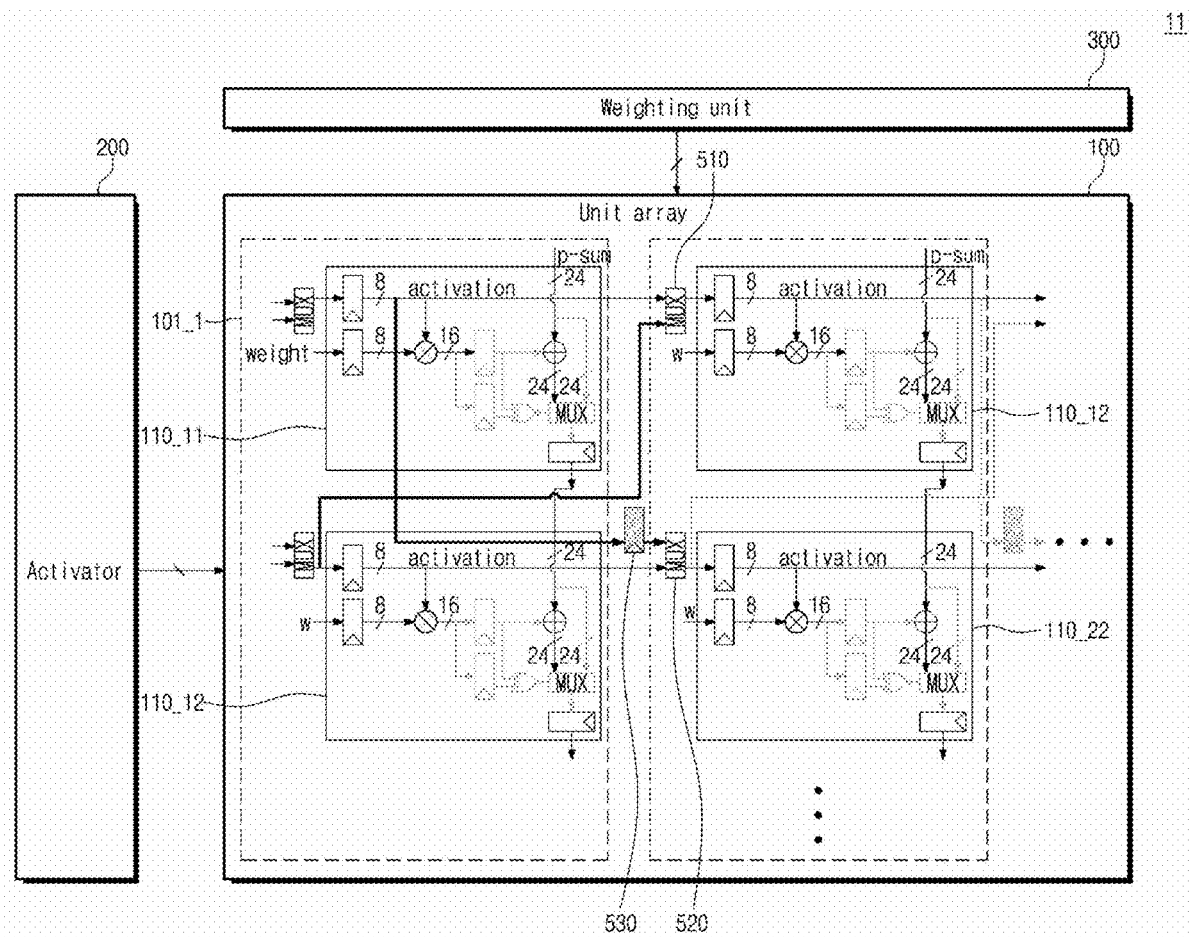
FIG. 6 is a block diagram showing a deep neural network accelerator according to another exemplary embodiment of the present disclosure.
Figure 7:
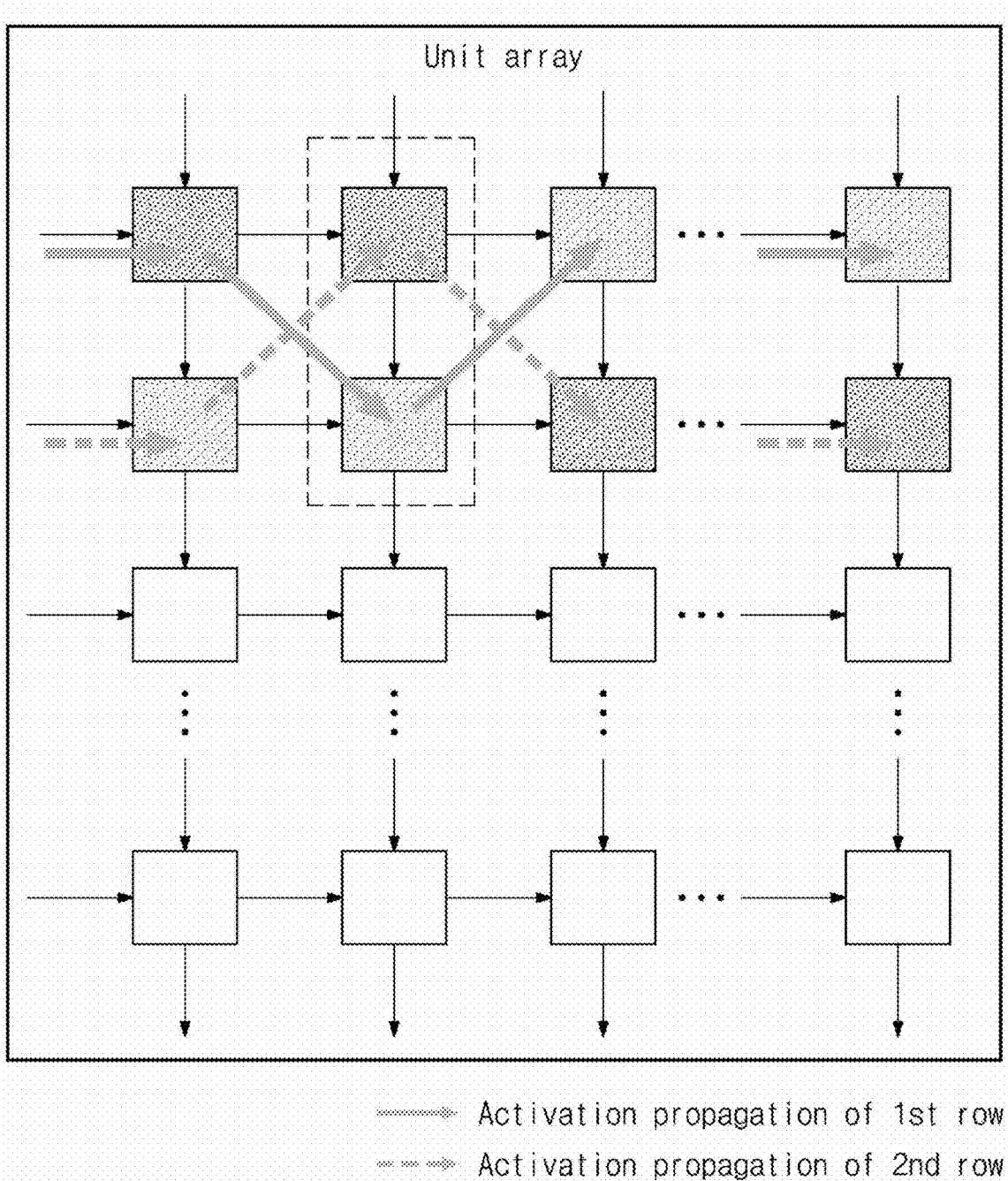
FIG. 7 is a view showing first and second activation propagation paths of FIG. 6.

FIG. 6 is a block diagram showing a deep neural network accelerator 11 according to another exemplary embodiment of the present disclosure, and FIG. 7 is a view showing first and second activation propagation paths of FIG. 6.

Referring to FIGS. 6 and 7, the deep neural network accelerator 11 may include a unit array 100, an activator 200, a weighting unit 300, first and second multiplexers 510 and 520, and an activation propagation delay flip-flop 530. Hereinafter, detailed descriptions of the unit array 100, the activator 200, and the weighting unit 300, which are assigned with the same reference numerals as those described with reference to FIG. 1, will be omitted.

The unit array 100 may include first and second operational units 110_11 and 110_21 and third and fourth operational units 110_12 and 110_22.

In detail, the first and second operational units 110_11 and 110_21 may be disposed adjacent to each other in the column direction and may have different sizes from each other. The third and fourth operational units 110_12 and 110_22 may be disposed adjacent to each other in the column direction, may have different sizes from each other, and may be disposed adjacent to the first and second operational units 110_11 and 110_21 in a row line direction.

The size of the first and second operational units 110_11 and 110_21 may correspond to a magnitude of importance of each weight data mapped to the first and second operational units 110_11 and 110_21.

For example, when the importance of the weight mapped to the second operational unit 110_21 is smaller than the importance of the weight mapped to the first operational unit 110_11, the second operational unit 110_21 may have the size smaller than the first operational unit 110_11.

The first multiplexer 510 may connect one operational unit 110_11 of the first and second operational units 110_11 and 110_21 and the third operational unit 110_12 to a first activation propagation path. As shown in FIG. 7, the first activation propagation path may mean a data flow direction having a great impact (more robustness) on the DNN operation. In this case, the first multiplexer 510 may be a two-to-one multiplexer.

For example, the first multiplexer 510 may determine a path between one operational unit, which has a relatively large size among the first and second operational units 110_11 and 110_21 adjacent to each other in the column direction, and the third operational unit 110_12 as the first activation propagation path.

The second multiplexer 520 may connect the other operational unit of the first and second operational units 110_11 and 110_21 and the fourth operational unit 110_22 to a second activation propagation path. As shown in FIG. 7, the second activation propagation path may mean a data flow direction having a small impact (less robustness) on the DNN operation. In this case, the second multiplexer 520 may be a two-to-one multiplexer.

For example, the second multiplexer 520 may determine a path between one operational unit 110_21, which has a relatively small size among the first and second operational units 110_11 and 110_21 adjacent to each other in the column direction, and the fourth operational unit 110_22 as the second activation propagation path.

According to the exemplary embodiment, when the importance of the weight mapped to the fourth operational unit 110_22 is greater than the importance of the weight mapped to the third operational unit 110_22, the first multiplexer 510 may connect the first and fourth operational units 110_11 and 110_22 to the first activation propagation path. In this case, the second multiplexer 520 may connect the second and third operational units 110_12 and 110_21 to the second activation propagation path.

According to another exemplary embodiment, when the importance of the weight mapped to the fourth operational unit 110_22 is smaller than the importance of the weight mapped to the third operational unit 110_22, the first multiplexer 510 may connect the first and third operational units 110_11 and 110_21 to the first activation propagation path. In this case, the second multiplexer 520 may connect the second and fourth operational units 110_12 and 110_22 to the second activation propagation path.

When the one operational unit is the third operational unit 110_12, the activation propagation delay flip-flop 530 may delay the first activation propagation path to synchronise the first and second activation propagation paths.

Figure 8:
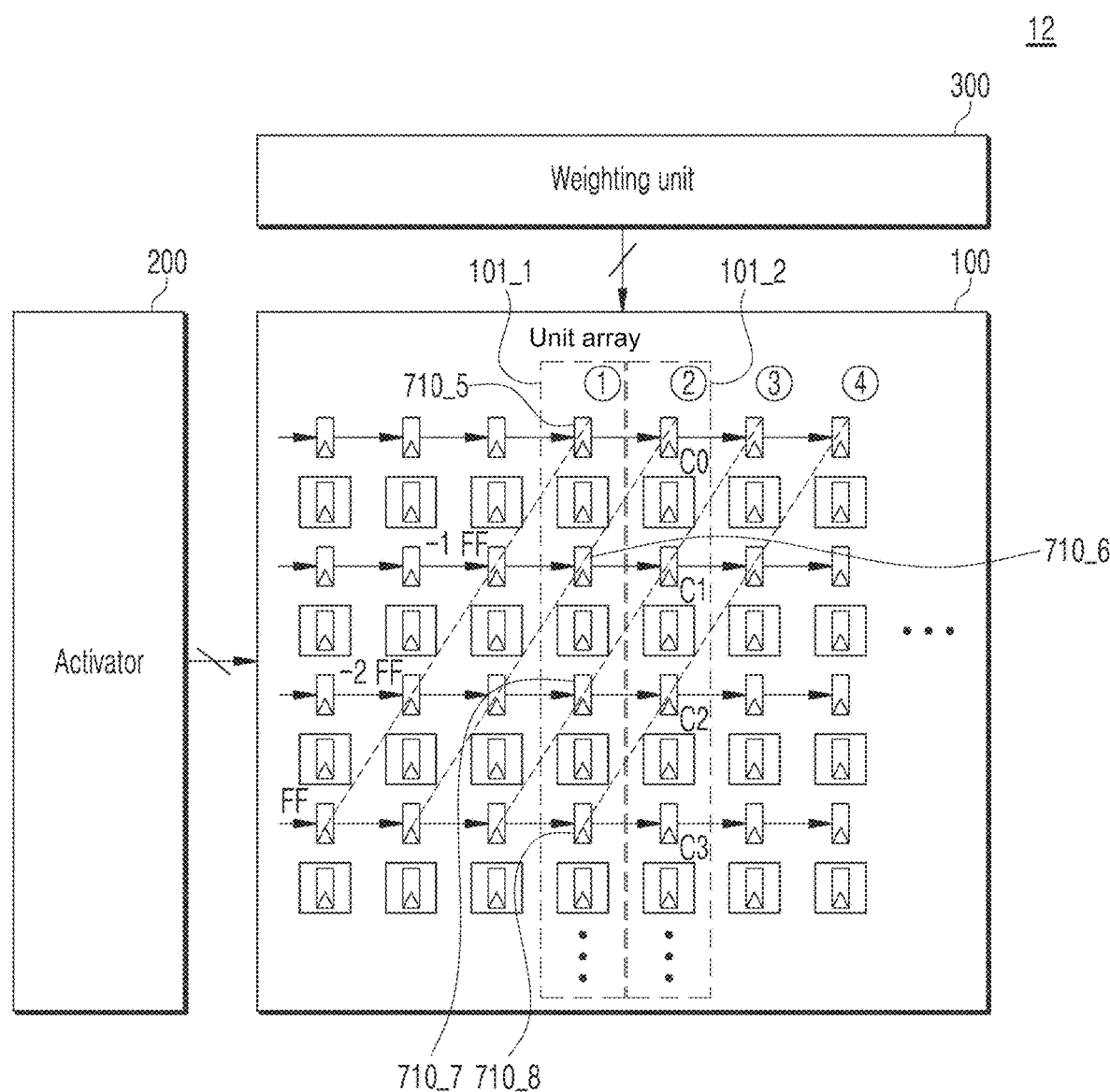
FIG. 8 is a block diagram showing a deep neural network accelerator according to another exemplary embodiment of the present disclosure.
Figure 9:
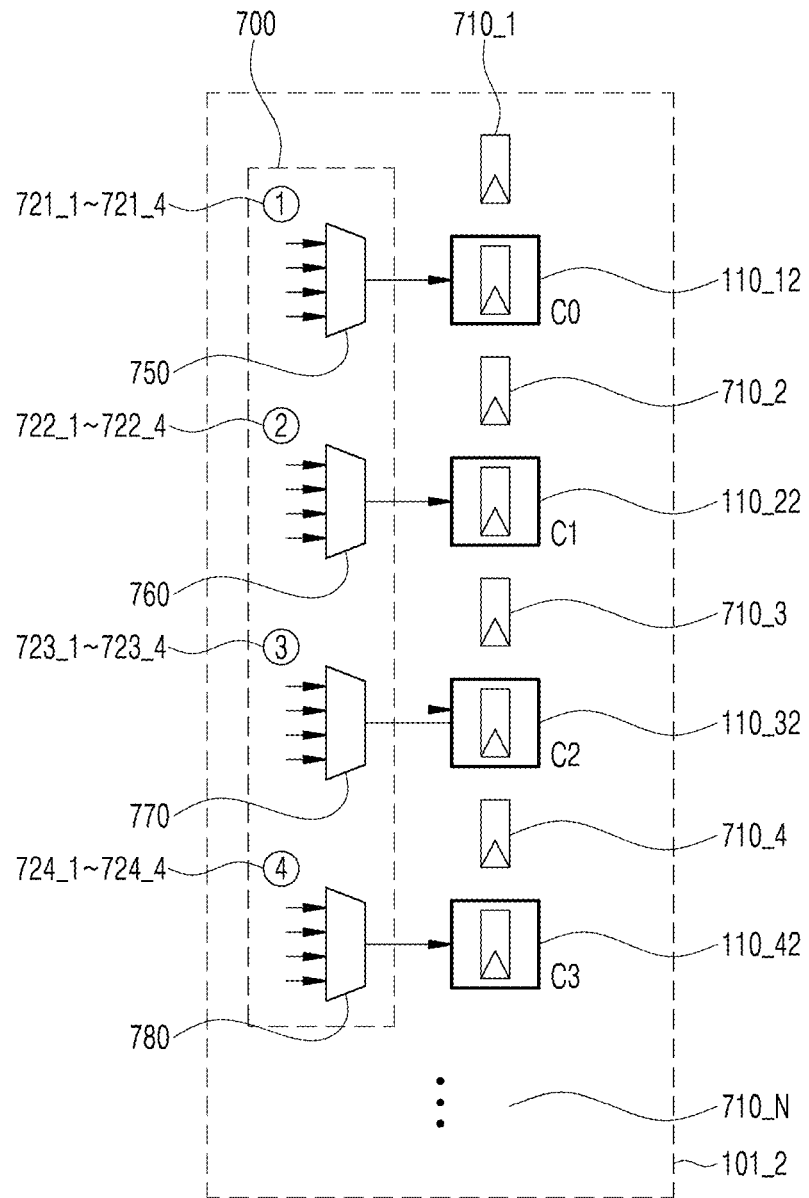
FIG. 9 is a block diagram showing a second sub-array of FIG. 8.
Figure 10:
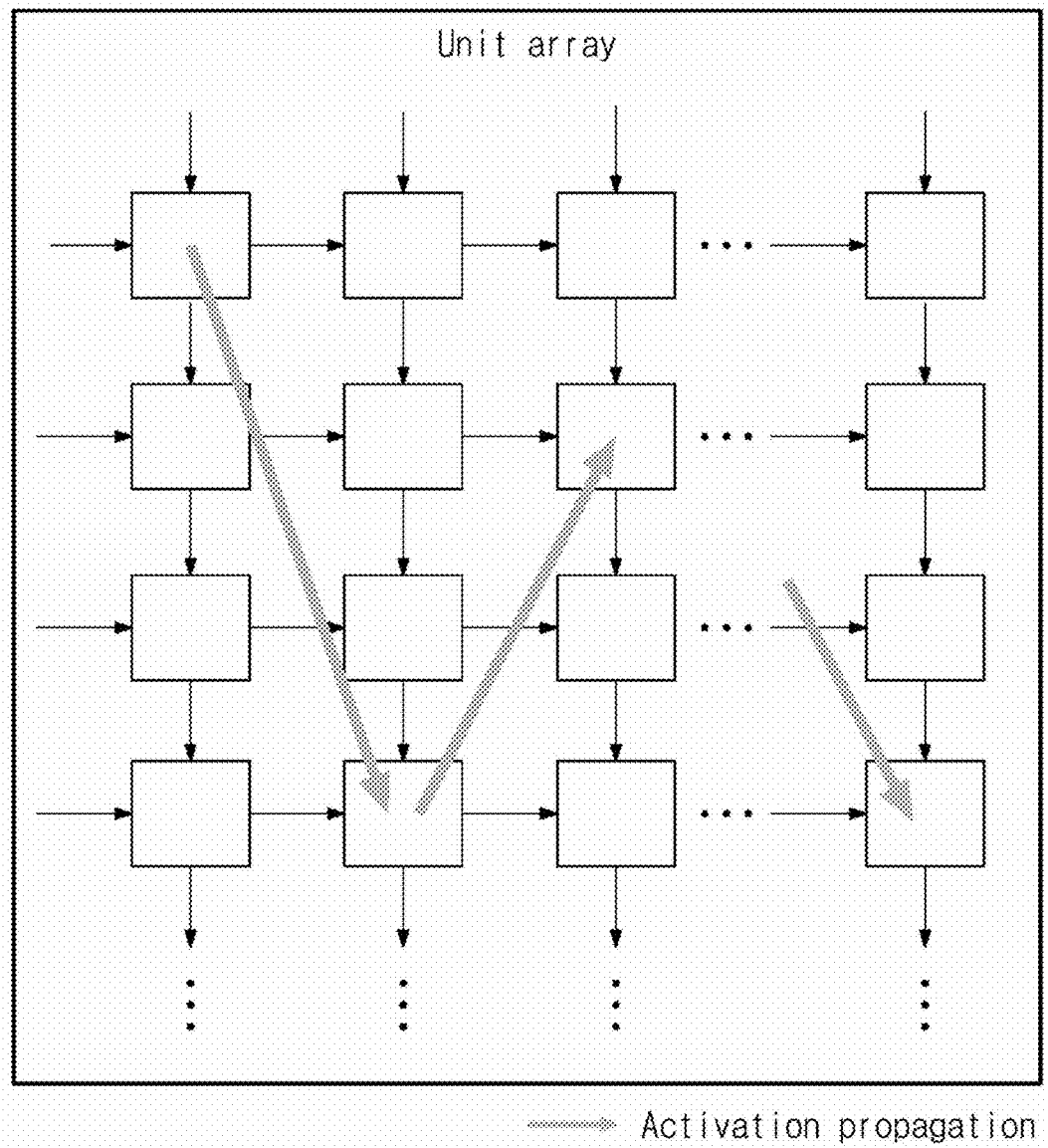
FIG. 10 is a view showing an activation propagation path of FIG. 8.

FIG. 8 is a block diagram showing a deep neural network accelerator 12 according to another exemplary embodiment of the present disclosure, FIG. 9 is a block diagram showing a second sub-array 101_2 of FIG. 8, and FIG. 10 is a view showing an activation propagation path of FIG. 8.

Referring to FIGS. 8 to 10, the deep neural network accelerator 12 may include a unit array 100, an activator 200, a weighting unit 300, and an activation propagation switching unit 700. Hereinafter, detailed descriptions of the unit array 100, the activator 200, and the weighting unit 300, which are assigned with the same reference numerals as those described with reference to FIG. 1, will be omitted.

The unit array 100 may include a plurality of operational units 110_11 to 110_NM arranged in a column direction and a row direction.

The unit array 100 may include first and second sub-arrays 101_1 and 101_2 adjacent to each other in the row direction.

In detail, the first sub-array 101_1 may include first to fourth operational units 101_11 to 110_41 that have different sizes from each other. In this case, a size of the first to fourth operational units 110_11 to 110_41 may decrease in the order of the first, second, third, and fourth operational units 110_11, 110_21, 110_31, and 110_41. For example, the first operational unit 110_11 may have the largest size among the first to fourth operational units 110_11 to 110_41.

The second sub-array 101_2 may include fifth to eighth operational units 101_12 to 110_42 that have different sizes from each other.

A plurality of activation delay flip-flops 710_1 to 710_N may receive and delay activations through the activator 200. In the present exemplary embodiment, the number of the activation delay flip-flops 710_1 to 710_N may correspond to the number of the operational units 110_11 to 110_NM. That is, the activation delay flip-flops 710_1 to 710_N may be included in at least one sub-array 101_1 to 101_M corresponding to the operational units 110_11 to 110_NM.

In detail, the first sub-array 101_1 may include first to fourth activation delay flip-flops 710_1 to 710_4 corresponding to the first to fourth operational units 110_11 to 110_41. In addition, the second sub-array 101_2 may include fifth to eighth activation delay flip-flops corresponding to the fifth to eighth operational units 110_12 to 110_42.

The activation propagation switching unit 700 may determine activation propagation paths for the operational units 110_11 to 110_NM in the unit of four operational units based on the activations delayed through the activation delay flip-flops 710_1 to 710_N.

The activation propagation switching unit 700 may determine first to fourth activation propagation paths for the fifth to eighth operational units 110_12 to 110_42 using fifth, sixth, seventh, and eighth multiplexers 750, 760, 770, and 780.

In detail, the fifth multiplexer 750 may select one activation propagation path among the first to fourth activation propagation paths for the fifth operational unit 110_12 based on the activations output through first diagonal-line activation delay flip-flops 721_1 to 721_4 corresponding to the fifth operational unit 110_12.

The sixth multiplexer 760 may select another activation propagation path among the first to fourth activation propagation paths for the sixth operational unit 110_22 based on the activations output through second diagonal-line activation delay flip-flops 722_1 to 722_4 corresponding to the sixth operational unit 110_22.

The seventh multiplexer 770 may select another activation propagation path among the first to fourth activation propagation paths for the seventh operational unit 110_32 based on the activations output through third diagonal-line activation delay flip-flops 723_1 to 723_4 corresponding to the seventh operational unit 110_32.

The eighth multiplexer 780 may select the other activation propagation path among the first to fourth activation propagation paths for the eighth operational unit 110_42 based on the activations output through fourth diagonal-line activation delay flip-flops 724_1 to 724_4 corresponding to the eighth operational unit 110_42.

Figure 11:
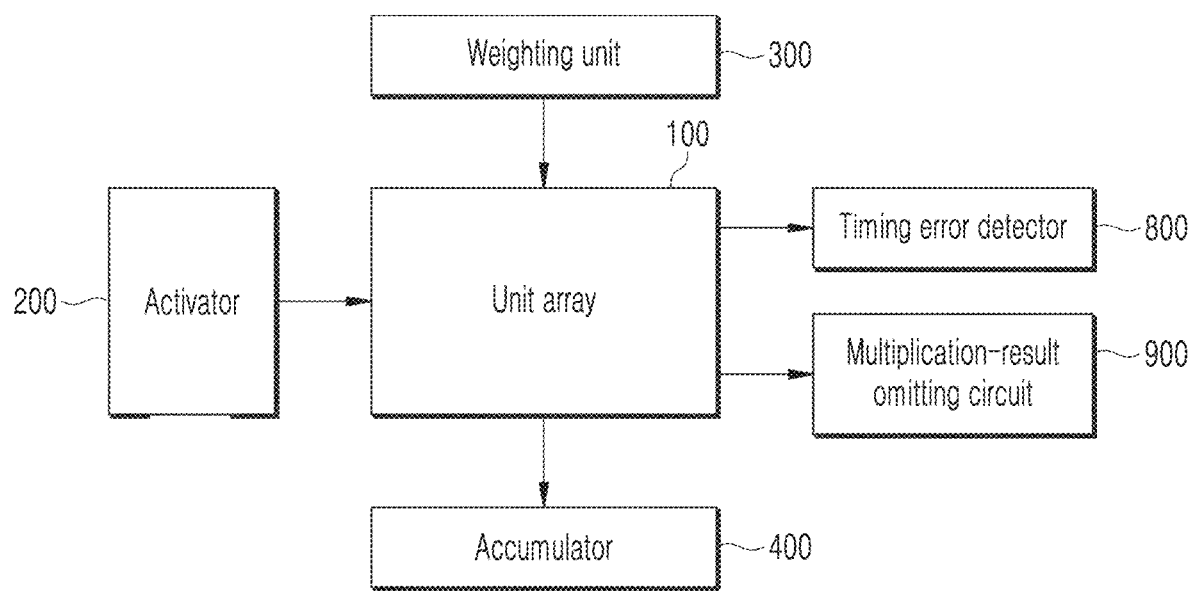
FIG. 11 is a block diagram showing a deep neural network accelerator according to another exemplary embodiment of the present disclosure.

FIG. 11 is a block diagram showing a deep neural network accelerator 13 according to another exemplary embodiment of the present disclosure.

Referring to FIG. 11, the deep neural network accelerator 13 may include a unit array 100, an activator 200, a weighting unit 300, an accumulator 400, a timing error detector 800, and a circuit for omitting multiplication results (hereinafter, referred to as a 'multiplication-result omitting circuit') 900.

The timing error detector 800 may detect timing errors from each of operational units 110_11 to 110_NM during the DNN operation based on a predetermined timing output time with respect to the operational units 110_11 to 110_NM.

The multiplication-result omitting circuit 900 may block an operation of a multiplier included in each of the operational units 110_11 to 110_NM based on each timing error detected by the riming error detector 800.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. A deep neural network accelerator using a multiply-accumulate unit, the deep neural network accelerator comprising:
   a unit array circuit comprising:
      a first sub-array comprising a first operational unit; and
      a second sub-array comprising a second operational unit, the first operational unit and the second operational unit being adjacent to each other in a column direction and having different sizes from each other based on respective sizes of hardware of the first operational unit and the second operational unit; and
      a third operational unit and a fourth operational unit adjacent to each other in the column direction, having different sizes from each other, and adjacent to the first operational unit and the second operational unit in a row direction;
   a first multiplexer configured to determine a path between the first operational unit and one operational unit of the third operational unit and the fourth operational unit as a first activation propagation path;
   a second multiplexer configured to determine a path between the second operational unit and the other operational unit of the third operational unit and the fourth operational unit as a second activation propagation path; and
   an activation propagation delay flip-flop configured to delay the first activation propagation path when the one operational unit is the third operational unit; and
   a timing error detector circuit configured to detect timing errors from each of the operational units,
   wherein the size of the first operational unit and the size of the second operational unit are in proportion to each cumulative importance value accumulated in each of the operational units of the unit array circuit while performing a deep neural network operation,
   wherein each of the cumulative importance values are is obtained by accumulating an importance for each weight mapped to each of the operational units of the unit array circuit, and
   wherein, when supply voltage is reduced to lower power consumption by the deep neural network accelerator, computational accuracy of the deep neural network operating at the reduced supply voltage is not decreased by a timing error, as detected by the timing error detector circuit, of the multiply-accumulate unit caused by the reduction in the supply voltage.

2. The deep neural network accelerator of claim 1, further comprising:
   an activator circuit configured to sequentially provide activations of an input feature map, which is previously stored, to the unit array circuit;
   a weighting unit circuit configured to map a plurality of weight patterns vectorized in one dimension by each three-dimensional filter, which is previously set, to the unit array circuit and provide different weights from each other to each of the operational units; and
   a first accumulator circuit configured to accumulate a partial sum corresponding to a value obtained by multiplying each activation provided to each of the operational units by each weight in a column direction.

3. The deep neural network accelerator of claim 2, wherein each of the first operational unit and the second operational unit comprises:
   a multiplier comprising at least one transistor;
   a first multiplier flip-flop connecting the multiplier to the activator circuit;
   a second multiplier flip-flop connecting the multiplier to the weighting unit circuit;
   a second accumulator circuit configured to accumulate a first partial sum output through the multiplier and a second partial sum output along a partial sum accumulation path; and
   a first accumulator flip-flop configured to delay the accumulated value of the first and second partial sums.

4. The deep neural network accelerator of claim 2,
wherein each of the weight patterns comprises a plurality of weights, and
wherein a number of the weight patterns corresponds to a number of at least one sub-array.

5. The deep neural network accelerator of claim 4, wherein the weights are mapped to a plurality of operational units of one sub-array of the at least one sub-array in a one-to-one correspondence.

6. The deep neural network accelerator of claim 1,
wherein the unit array circuit comprises a plurality of operational units comprising the first operational unit and the second operational unit, and
wherein the operational units are arranged in a column direction and a row direction.

7. The deep neural network accelerator of claim 6, wherein the operational units have different sizes from each other for each sub-array.

8. The deep neural network accelerator of claim 6,
wherein the operational units included in an operational unit block among the operational units have different sizes from each other, and
wherein the operational unit block comprises at least four operational units adjacent to each other in the column direction.

9. The deep neural network accelerator of claim 6, wherein the unit array circuit performs the deep neural network operation along a plurality of activation propagation paths corresponding to the row direction and a plurality of partial sum accumulation paths corresponding to the column direction.

10. A deep neural network accelerator using a multiply-accumulate unit, the deep neural network accelerator comprising:
a unit array circuit comprising:
a first operational unit and a second operational unit adjacent to each other in a column direction and having different sizes from each other based on respective sizes of hardware of the first operational unit and the second operational unit; and
a third operational unit and a fourth operational unit adjacent to each other in the column direction, having different sizes from each other, and adjacent to the first operational unit and the second operational unit in a row direction;
a first multiplexer configured to determine a path between the first operational unit and one operational unit of the third operational unit and the fourth operational unit as a first activation propagation path;
a second multiplexer configured to determine a path between the second operational unit and the other operational unit of the third operational unit and the fourth operational unit as a second activation propagation path; and
an activation propagation delay flip-flop configured to delay the first activation propagation path when the one operational unit is the third operational unit; and
a timing error detector circuit configured to detect timing errors from each of the operational units,
wherein, when supply voltage is reduced to lower power consumption by the deep neural network accelerator, computational accuracy of the deep neural network operating at the reduced supply voltage is not decreased by a timing error, as detected by the timing error detector circuit, of the multiply-accumulate unit caused by the reduction in the supply voltage.

11. The deep neural network accelerator of claim 10, wherein the first operational unit has a size greater than a size of the second operational unit when an importance of a weight mapped to the first operational unit is greater than an importance of a weight mapped to the second operational unit.

12. The deep neural network accelerator of claim 10,
wherein, when an importance of a weight mapped to the fourth operational unit is greater than an importance of a third weight mapped to the third operational unit, the first multiplexer is configured to determine a path between the first operational unit and the fourth operational unit as the first activation propagation path, and the second multiplexer is configured to determine a path between the second operational unit and the third operational unit as the second activation propagation path.

13. The deep neural network accelerator of claim 10,
wherein, when an importance of a weight mapped to the fourth operational unit is smaller than an importance of a weight mapped to the third operational unit, the first multiplexer is configured to determine a path between the first operational unit and fourth operational unit as the first activation propagation path, and the second multiplexer is configured to determine a path between the second operational unit and the third operational unit as the second activation propagation path.

14. The deep neural network accelerator of claim 10, wherein each of the first multiplexer and the second multiplexer comprises a two-to-one multiplexer.

15. A deep neural network accelerator using a multiply-accumulate unit, the deep neural network accelerator comprising:
a unit array circuit comprising a plurality of operational units, the plurality of operational units including:
a first operational unit and a second operational unit adjacent to each other in a column direction and having different sizes from each other based on respective sizes of hardware of the first operational unit and the second operational unit; and
a third operational unit and a fourth operational unit adjacent to each other in the column direction, having different sizes from each other, and adjacent to the first operational unit and the second operational unit in a row direction;
a first multiplexer configured to determine a path between the first operational unit and one operational unit of the third operational unit and the fourth operational unit as a first activation propagation path;
a second multiplexer configured to determine a path between the second operational unit and the other operational unit of the third operational unit and the fourth operational unit as a second activation propagation path; and
an activation propagation delay flip-flop configured to delay the first activation propagation path when the one operational unit is the third operational unit; and
an activator circuit providing activations to the unit array circuit;
a plurality of activation delay flip-flops configured to receive the activations from the activator circuit and delay the received activations;
an activation propagation switching unit circuit configured to determine activation propagation paths for the operational units in the unit of four operational units based on the activations delayed by the activation delay flip-flops; and a timing error detector circuit configured to detect timing errors from each of the operational units, wherein, when supply voltage is reduced to lower power consumption by the deep neural network accelerator, computational accuracy of the deep neural network operating at the reduced supply voltage is not decreased by a timing error, as detected by the timing error detector circuit, of the multiply-accumulate unit caused by the reduction in the supply voltage.

16. The deep neural network accelerator of claim 15, wherein a number of the activation delay flip-flops corresponds to a number of the operational units.

17. The deep neural network accelerator of claim 16, wherein the unit array circuit comprises:

a first sub-array comprising the first operational unit, the second operational unit, the third operational unit, and a fourth operational unit having different sizes from each other among the operational units based on a size of hardware of the operational units; and a second sub-array disposed adjacent to the first sub-array in a row line direction and comprising fifth, sixth, seventh, and eighth operational units having different sizes from each other, and wherein a size of the first to fourth operational units decreases in an order of the first, second, third, and fourth operational units.

18. The deep neural network accelerator of claim 17, further comprising:

a fifth multiplexer configured to select one activation propagation path among first, second, third, and fourth activation propagation paths with respect to a fifth operational unit using first diagonal-line activation delay flip-flops corresponding to the fifth operational unit;

a sixth multiplexer configured to select another activation propagation path among the first, second, third, and fourth activation propagation paths with respect to a sixth operational unit using second diagonal-line activation delay flip-flops corresponding to the sixth operational unit;

a seventh multiplexer configured to select another activation propagation path among the first, second, third, and fourth activation propagation paths with respect to a seventh operational unit using third diagonal-line activation delay flip-flops corresponding to the seventh operational unit; and an eighth multiplexer configured to select the other activation propagation path among the first, second, third, and fourth activation propagation paths with respect to an eighth operational unit using fourth diagonal-line activation delay flip-flops corresponding to the eighth operational unit.

19. The deep neural network accelerator of claim 18, wherein each of the fifth, sixth, seventh, and eighth multiplexers is a four-to-one multiplexer.

* * * * *